(12) United States Patent
Nocera, Jr.

(10) Patent No.: US 11,833,448 B2
(45) Date of Patent: *Dec. 5, 2023

(54) SYSTEM AND METHOD FOR CONTINUOUS STIRRED TANK SOLVENT EXTRACTION USING FEEDSTOCK

(71) Applicant: Kultevat, Inc., Creve Coeur, MO (US)

(72) Inventor: Anthony Nocera, Jr., Creve Coeur, MO (US)

(73) Assignee: Kultevat, Inc., Creve Coeur, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,988

(22) Filed: Jan. 13, 2023

(65) Prior Publication Data

US 2023/0149828 A1 May 18, 2023

Related U.S. Application Data

(63) Continuation of application No. 17/328,647, filed on May 24, 2021, now Pat. No. 11,565,195, which is a
(Continued)

(51) Int. Cl.
*B01D 11/02* (2006.01)
*B01D 43/00* (2006.01)

(52) U.S. Cl.
CPC ...... *B01D 11/0257* (2013.01); *B01D 11/0207* (2013.01); *B01D 11/0284* (2013.01);
(Continued)

(58) Field of Classification Search
CPC ............ B01D 11/0257; B01D 11/0207; B01D 11/0284; B01D 43/00; B01D 2221/06;
(Continued)

(56) References Cited

U.S. PATENT DOCUMENTS 3,585,104 A 6/1971 Kleinert
4,046,668 A 9/1977 Farcasiu et al.
(Continued)

FOREIGN PATENT DOCUMENTS

CN 1398604 A 2/2003
CN 102172437 A 9/2011
(Continued)

OTHER PUBLICATIONS

Machine translation for CN-205275662 U (Year: 2023).*
(Continued)

*Primary Examiner* — Huy Tram Nguyen
(74) *Attorney, Agent, or Firm* — Thompson Coburn LLP (57) ABSTRACT

A feedstock processing system extracts a product from a solid using a CTSE system comprising a plurality of continuous stirred tank extraction stages arranged in fluid communication with each other in series such that effluent from one stage flows to a next stage in the series. One of the stages has an inlet to allow a measured amount of liquid solvent and the solid to be introduced to the continuous stirred tank extraction stage. The stage mixes the solid with the introduced solvent to form a homogeneous slurry to enable the product associated with the solid to be extracted with the solvent. A solid-liquid separator is arranged in fluid communication with the continuous stirred tank extraction stages, and receives an effluent from one of the stages and separates the liquid solvent containing the product from the solid to form a product-containing liquid and a product-depleted solid.

20 Claims, 3 Drawing Sheets

Related U.S. Application Data continuation of application No. 16/055,573, filed on Aug. 6, 2018, now Pat. No. 11,033,833.

(60) Provisional application No. 62/542,504, filed on Aug. 8, 2017.

(52) U.S. Cl.
CPC .......... *B01D 43/00* (2013.01); *B01D 2221/06* (2013.01); *B01D 2221/10* (2013.01); *B01D 2257/704* (2013.01); *B01D 2311/10* (2013.01)

(58) Field of Classification Search
CPC .......... B01D 2221/10; B01D 2257/704; B01D 2311/10
USPC ....................................................... 422/269
See application file for complete search history.

(56) References Cited

U.S. PATENT DOCUMENTS

| | | | |
|---|---|---|---|
| 4,746,401 A | 5/1988 | Roberts et al. | |
| 7,923,039 B2* | 4/2011 | Cornish ............. | B01D 11/0284 528/502 A |
| 9,211,483 B2 | 12/2015 | Merkel et al. | |
| 9,346,924 B2 | 5/2016 | Wade et al. | |
| 9,611,363 B2 | 4/2017 | Swiger et al. | |
| 10,584,185 B2 | 3/2020 | Nocera, Jr. et al. | |
| 10,793,779 B2 | 10/2020 | Ma et al. | |
| 11,033,833 B2 | 6/2021 | Nocera, Jr. | |
| 11,230,613 B2 | 1/2022 | Nocera, Jr. et al. | |
| 2004/0211723 A1 | 10/2004 | Husain et al. | |
| 2006/0149015 A1 | 7/2006 | Cornish et al. | |
| 2007/0276112 A1 | 11/2007 | Buranov | |
| 2009/0325253 A1 | 12/2009 | Ascon et al. | |
| 2011/0100359 A1 | 5/2011 | North | |
| 2012/0032007 A1 | 2/2012 | Mulder et al. | |
| 2012/0071675 A1 | 3/2012 | Abramov et al. | |
| 2012/0101259 A1 | 4/2012 | Green et al. | |
| 2012/0151826 A1 | 6/2012 | Powell et al. | |
| 2012/0190092 A1 | 7/2012 | Jaquess et al. | |
| 2013/0210102 A1 | 8/2013 | Slupska et al. | |
| 2013/0210103 A1 | 8/2013 | Slupska et al. | |
| 2013/0224816 A1 | 8/2013 | Elliott et al. | |
| 2014/0094630 A1 | 4/2014 | Anton et al. | |
| 2014/0096830 A1 | 4/2014 | Gastaldo et al. | |
| 2014/0106419 A1 | 4/2014 | Bazzana et al. | |
| 2014/0275621 A1 | 9/2014 | Donen et al. | |
| 2014/0288255 A1 | 9/2014 | Martin et al. | |
| 2015/0167238 A1 | 6/2015 | Powell et al. | |
| 2015/0247010 A1 | 9/2015 | Swiger et al. | |
| 2016/0215312 A1 | 7/2016 | Holtzapple et al. | |
| 2019/0233595 A1 | 8/2019 | Hiruschka et al. | |

FOREIGN PATENT DOCUMENTS

| | | | |
|---|---|---|---|
| CN | 202044951 U | | 11/2011 |
| CN | 103301206 A | | 9/2013 |
| CN | 103435720 A | | 12/2013 |
| CN | 103920305 B | | 12/2015 |
| CN | 205275662 U | * | 6/2016 |
| CN | 106178587 A | | 12/2016 |
| CN | 205796604 U | | 12/2016 |
| CN | 106362434 A | | 2/2017 |
| CN | 106582058 A | | 4/2017 |
| CN | 106943768 A | | 7/2017 |
| CN | 206334386 U | | 7/2017 |
| EP | 3390460 A1 | | 10/2018 |
| GT | 197958349 A | | 12/1980 |
| JP | S62-042703 A | | 2/1987 |
| JP | 2004-066227 A | | 3/2004 |
| JP | 2009040744 A | | 2/2009 |
| JP | 2009-226357 A | | 10/2009 |
| JP | 2012-516696 A | | 7/2012 |
| JP | 2016-222746 A | | 12/2016 |
| WO | 2013192217 A1 | | 12/2013 |
| WO | 2017103769 A1 | | 6/2017 |
| WO | 2017103775 A1 | | 6/2017 |
| WO | 2017103782 A1 | | 6/2017 |
| WO | 2018036825 A1 | | 3/2018 |

OTHER PUBLICATIONS

Extended European Search Report and Written Opinion for Application No. 18845274.2 dated Apr. 19, 2021.
International Search Report and Written Opinion for PCT/US2018/045363 dated Oct. 18, 2018.
International Search Report and Written Opinion for PCT/US2018/045371 dated Oct. 29, 2018.
Ramirez-Cadavid et al., "Taraxacum Kok-Saghyz (TK): Compositional Analysis of a Feedstock for Natural Rubber and Other Bioproducts", Industrial Crops & Products, May 23, 2017, 17 pages.
WPI, Database Accession No. 2014-C69031 and CN103435720A with English machine translation, 12 pages.

* cited by examiner

Figure 1
CSTE SYSTEM

Figure 2
MULTIPLE CSTE SYSTEMS (*) Wet or Dried Product Depleted (Spent) Solids

Figure 3

EXTRACTED PRODUCTS AND SPENT SOLIDS MARKET APPLICATIONS

SYSTEM AND METHOD FOR CONTINUOUS STIRRED TANK SOLVENT EXTRACTION USING FEEDSTOCK

CROSS REFERENCE TO RELATED APPLICATIONS

This application is a continuation of U.S. application Ser. No. 17/328,647, filed May 24, 2021, now U.S. Pat. No. 11,565,195, issued Jan. 31, 2023, which is a continuation of U.S. application Ser. No. 16/055,573, filed Aug. 6, 2018, now U.S. Pat. No. 11,033,833, issued Jun. 15, 2021, which claims the benefit of provisional application Ser. No. 62/542,504, which was filed on Aug. 8, 2017, the disclosures all of which are incorporated by reference herein.

BACKGROUND & SUMMARY

The disclosure relates to a feed stock processing system and method for continuous stirred tank extraction of selected or target product(s) from solids containing feedstocks. The exemplary feedstock processing system and methods provides for a continuous process flow of feedstock and selected solvent through one or more continuous stirred tank extraction (CSTE) tanks or stages connected in series. The CSTE stages with the addition of the solids separator connected in series form a CSTE system. One or more CSTE systems may be arranged to form the feedstock processing system. Specific processes may be performed within the stages of the CSTE system depending upon the nature of the feedstock and the selected or target product(s) to be extracted from the feedstock using the selected solvent.

The exemplary system and method allows for continuous processing of the feedstock. The system and method may be performed 24 hours per day and seven days per week. The system and methods allow for commercial-scale processing of feedstock and will offer the lowest capital installation and manufacturing operating costs per amount of processed feedstock versus traditional and existing commercial scale extraction methods. In order to be economically viable, high efficiency of extraction in terms of the amount of product recovered from the feedstock is required. With the system and methods disclosed herein, efficiency can be increased to be commercially competitive and superior compared with other commercial scale extraction processing methods.

As will be described in greater detail below, the exemplary system and method optimizes the extraction of selected or target product(s) from the feed stock. Generally speaking, the method of extracting selected or target product(s) from the feed stock solid in accordance with the principles of the disclosure comprises:

(i) Solids Conditioning & Preparation—In order to extract both the target product(s) on the surface of the feedstock solids, and the product(s) held within the feedstock solids, the particle size and/or shape of feedstock should be reduced, altered, or changed. The solids comprising the feedstock may be chopped, shredded, milled, crushed, and/or pulverized to expand the surface area and open the solids of the feedstock for extraction via exposure to a liquid solvent and penetration of the solvent. Additional conditioning such as soaking, maceration, softening and/or drying of the feedstock can also improve expansion of the surface area of the solids of feedstock for exposure to the liquid solvents and subsequent increased mass transfer product extraction from penetration of the solvent into the conditioned and prepared solid particles.

(ii) Extraction Temperature—By increasing the CSTE stirred tank stage pressure and temperature, the conditions for the solvent extraction efficiency to extract the target product(s) from the conditioned feedstock substantially increases. The higher operating temperature increases the solubility of the product(s) in the solvent and lowers the viscosity of the liquid and enables the mass transfer of the conditioned feedstock to be optimized. By placing several extraction vessels or stages in series to form the CSTE system, each extraction vessel or stage may operate at a selected pressure and temperature to enable optimum mass transfer and optimum extraction of target product(s) from the solid feedstock. By way of example, one or more vessels or stages may be configured to operate at atmospheric pressure using a reflux condenser to minimize the solvent losses. Other vessels or stages may be configured to operate at higher temperatures and pressures in a closed system to obtain the optimum extraction performance and efficiency for a selective solvent extraction of a given solid feedstock. Tanks or stages configured to operate at higher temperatures and pressures can be partially isolated from other tanks or stages in the series. Tanks or stages configured to operate at higher temperatures and pressures may allow for the elimination of transfer pumps and solvent vapor losses between vessels or stages. This in turn increases the solids to solvent ratio reducing the vessel or stage volumes and allows for a potential economic option of using lower purchased cost solvents. Together with mixing discussed below, operating at the highest allowable temperature given the solubility of the solvent and desired product(s) to be extracted from the solid feedstock results in improved overall extraction efficiency performance and lower commercial scale capital and manufacturing operating costs.

(iii) Mixing, Agitation & Wet Milling—Mixing inside a tank or stage is accomplished using conventional internal mechanical agitation and appropriately designed internal mechanical baffling. Mixing with aggressive agitation enables the conditioned solid particles to be uniformly suspended in a homogeneous solution and allows the solvent to efficiently contact and dissolve the surface product(s) and improves the solvent mass transfer for penetration, transport, dissolving the internal product, and the transport of the exiting dissolved product laden liquid solvent from the internals of the solid particle. Mixing with aggressive agitation also enables the solvent in a liquid phase slurry to achieve a uniform viscosity, thereby increasing the mass transfer for transport penetration and exiting of the conditioned solid particle. This in turn increases the solids to solvent ratio, along with increased operating temperature and pressure, as discussed above. Improved mixing at the highest allowable temperature given the solubility of the solvent and desired product(s) to be extracted from the feedstock provides the means to substantially improve the extraction efficiency. Mixing and agitation improves the heat transfer through the vessel wall and heat exchange with a heat exchanger integrally formed therewith. Additionally or in the alternative, heat transfer elements can be designed and installed inside the agitated tank or stage to maintain the optimum pressure and temperature within the tank or stage. An external heat exchanger can be provided in a recirculation loop to further control temperature of the feed stock in the tank or stage when the heat transfer area of the tank is not adequate for temperature control on the stage. The liquid slurry can be heated or cooled as necessary through the heat exchanger in the recirculation loop as needed as well as thermal convection in the jacketed tank and thermal conduction through the tank wall and/or internal heating elements such as coils, panels, etc. Further, additional particle size reduction of the feedstock may be provided with the modification of the internal agitation blades to create additional shear, and/or with a wet mill disposed in the recirculation loop. The further reduction of particle size and altering the shape of the feedstock will allow for improved extraction efficiency, higher solids to solvent ratio resulting in reduced stage volume, a reduced number of stages, and lower overall cycle time.

(iv) Extraction Solvent—An extraction solvent may be chosen based on the solubility of the product(s) at a tank's or stage's operating temperature and pressure, and must be chemically compatible with the conditioned solid feedstock, and the final selected or target product(s). Many choices of both aqueous and organic solvents may be used effectively with high efficiency. The liquid solvent may be introduced in any stage to allow extraction of a target product(s) as the feedstock flows through the stages in the CSTE system. In the alternative, two or more solvents may be introduced in a stage to allow extraction of two or more target product(s) as the feedstock flows through the stages in the CSTE system. The solvents may be miscible or immiscible. For immiscible solvent systems, the mixing/agitation can be provided to create a homogeneous emulsified stage for improved extraction efficiency for both immiscible solvents. The best and preferred commercial scale selection of solvent(s) is based on the feedstock, the target product(s) to be extracted, process design and extraction efficiency, capital installation cost and projected manufacturing operating expense.

(v) Cycle Time—Overall cycle time for each stage in the CSTE system may be controlled by balancing the mass flow rate required to make the capacity objectives, the volume of each vessel at each stage, and the number of stages to accomplish the extraction efficiency objectives. Each stage may be configured for the specific conditions to optimize the performance and extraction efficiency with the aim of reducing capital investment and lowering operating expenses for the CSTE system and overall solid feedstock processing system.

The solid feedstock processing system described herein uses a solid feedstock with target product(s) that can be extracted using a liquid solvent. By way of example and not in any limiting sense, the target product(s) and biomass-type feedstock may include one or more of the following: (a) natural rubber from rubber bearing plants; (b) Flavors for processed foods, e.g., rosemary, other seasonings, citrus, green tea, etc., (c) food product, e.g., extractable proteins, oils and lipids for food applications decaffeinated coffee, etc., (d) fragrances, e.g., perfumes, food additives, etc., (e) cosmetics such as natural facial, hair, and skins treatments, etc., (f) medicines and nutraceuticals, e.g., natural ingredients known to treat or cure diseases for humans and animals, (g) *cannabis* and extraction of oils and valuable chemical compounds, (h) oils and lubricants, e.g., plant oils and lubricants from seeds and other parts of the renewable biomass, (i) renewable biomass biofuels, biodiesel, and fuel additives, (j) lignin and resins, e.g., adhesive and other binding uses—particle board, laminates, etc., (k) carbohydrates and sugars used for foods or as a raw material for chemical synthesis of biofuels via fermentation or other synthetic products & processes as a replacement for petroleum derived feedstock's, (l) algae, e.g., extraction of oils and chemical products for food, biofuels and selected chemicals medical or nutraceutical products such as Astaxantin, DHA—Docosahexanoic Acid, EPA—Eicosapentaenoic acid, Proteins, and other natural made chemicals for many different markets.

The system as described herein may also be used to in connection with non-biomass type feedstocks, including but not limited to: (a) extraction of petroleum oil, e.g., extraction of tar sands and shale formations; (b) mining, e.g., extraction of minerals and or metals from natural geological formations; (c) environmental remediation, e.g., extraction of contaminated soils and other solid materials; (d) coal and extraction of impurities for clean coal applications; (e) plastics—use for recycle and extraction of dissolved components.

A summary of an exemplary process follows below. In accordance with a first step of the method, the solid feedstock may be received and stored. The extraction processing facility may receive the solid feedstock in bulk by truck, rail, barge or ship or by other means such as tote bins, bags, or containers. A storage area at the facility may be designated and configured for adequate storage of the solids to provide inventory for the continuous extraction system and protect the solids if weather and or spoilage can affect the product yield and/or the other processing variables.

In accordance with another step of the method, the feedstock will be conditioned and prepared for processing. In order to extract both the product on the surface of the solids and the product held within the solids, the solid feedstock should be reduced in particle size and/or altered in shape. The solids may be chopped, shredded, milled, crushed, and pulverized to expand the surface area and open the solids for extraction solvent penetration and mass transfer. Additional conditioning such as soaking or softening and drying may also improve the solid feedstock for continuous liquid solvent extraction.

In accordance with another step of the method, the conditioned and prepared feedstock may be introduced into a first stage. The stages are arranged in series and are designed and controlled to optimize and provide a high performance extraction efficiency, product quality and product yield. Each stage is in fluid communication with the next stage in series. By fluid communication, the stages may be configured to receive a liquid, a fluid comprising solid and liquid (for instance, a slurry) from the stage connected therewith. The effluent from a stage will be a liquid, or a fluid comprising mixed solid particles and liquid, referred to as the slurry. The number of stages in series will be designed based on the operating capacity, mass balance flow rates, yield requirements, and optimized operating conditions and cycle times. The CSTE system should be configured to optimize the processing conditions, for instance, feedstock conditioning, pressure & temperature, mixing and agitation, and wet milling. The feedstock processing system may have any number of CSTE systems comprising any number of stages, depending upon processing objectives and requirements.

The conditioned and prepared solid feedstock will be measured or metered into the first stage. Simultaneously the liquid solvent, which can be preheated to operating temperature, will be measured or metered into the first stage agitated vessel to form a slurry phase where the solids are completely suspended in the liquid solvent, for instance, in a homogeneous mixture with no stratification within the stage. The agitator and internal agitation blades of the stage can be designed for high, medium or low shear mixing and chopping. A wet mill may be placed in a recirculation loop with the stage to further reduce the feed stock particle size and alter the shape. The suspended biomass in the liquid solvent, or slurry can be temperature controlled and transferred from the last stage to the continuous solids separation step.

In accordance with another step of the method, the solid will be separated from the liquid solvent. The solids mixed with the solvent, which will resemble a homogeneous slurry. As mentioned above, in the homogeneous slurry, the solids are uniformly dispersed within the liquid with no stratification. The solids mixed with the solvent are then cooled prior to the separation step and may be continuously processed for separation by centrifugation, atmospheric or vacuum filter belt, belt press, automated and non-automated pressure filtration, rotary vacuum precoat filter, dissolved gas flotation, settling or any other solids liquid continuous separation process or supporting equipment. The solids can be washed with fresh or cleaned recycled solvent during the separation process to maximize product recovery and yield. The solvent wet solids leaving the separator will be transferred for spent biomass processing. The liquid with the dissolved product(s), which may be the target product(s) or an intermediate form of the target product(s), may be pumped through a polishing filter, for instance, less than 100 microns, to remove suspended fine solids. The solids free liquids with the dissolved product(s) may be then transferred for purification, final product(s) recovery, and solvent recovery. The finished or target product(s) may be packaged and inventoried or inventoried and shipped by bulk or in smaller packages for sales. The recovered solvent may be recycled and reused, thereby reducing the solvent usage and lowering the operating expense.

In accordance with another aspect of the method, the depleted and/or spent solids, for instance, spent biomass, may be further processed for re-use. Spent solid from the solids separation step is typically wet with the solvent used during the extraction process. The wet spent solids may be dried with solvent collection equipment, and any collected solvent may be recycled or reused. By way of example, when using biomass as feedstock, the dried spent biomass may have a BTU content of approximately 7,500 BTU per pound and may be used as feedstock as the fuel source for a boiler to produce utility steam at the manufacturing facility. The boiler may be equipped to use either natural gas, fuel oil, or other local and economically viable fuel to supplement the energy requirements of the facility. When the facility capacity is large and an excess amount of energy can be produced by burning the spent biomass, high pressure steam can be produced to drive turbines to produce electrical power for the facility and for export as a source of revenue to a local power grid. Therefore, the method provides an option to use all of the spent biomass to produce heat energy in the form of low, medium, and high pressure steam and electrical power to operate the facility and sell the excess to a local power grid. When the boiler is burning biomass, it will produce ash that can be used as a byproduct in road construction, as a concrete additive, insulation for steel manufacturing, building materials, and other applicable markets. Dried spent biomass has other potential markets as an animal feed supplement, cellulose insulation, additive or filler for particle board and/or laminates, soil improvement, building supplies, and other direct sales not currently mentioned. The dried spent biomass can also be feedstock for enzymatic digestion and fermentation to produce biofuels such as ethanol used for gasoline and converted using supercritical water as a source of carbon feedstock for biological processes and for synthesis of other chemicals currently manufactured and supplied from petroleum derivatives. In summary, the dried spent biomass from the process may be used based on economic viability, and that results in an overall renewable and sustainable continuous process where all elements of the biomass are used to produce numerous products without creating wastes that are an environmental burden and cost impact effecting the profitability of the operation. This system is a model of a commercial scale bio-refinery concept. By way of example, when using other than biomass solids as feedstock, the dried solids can be used for the following applications: (a) Land refill or reclamation; (b) aggregate for landscaping, road construction and building materials; (c) recycle or reuse of plastic materials, and other market applications.

DETAILED DESCRIPTION

Figure 1:
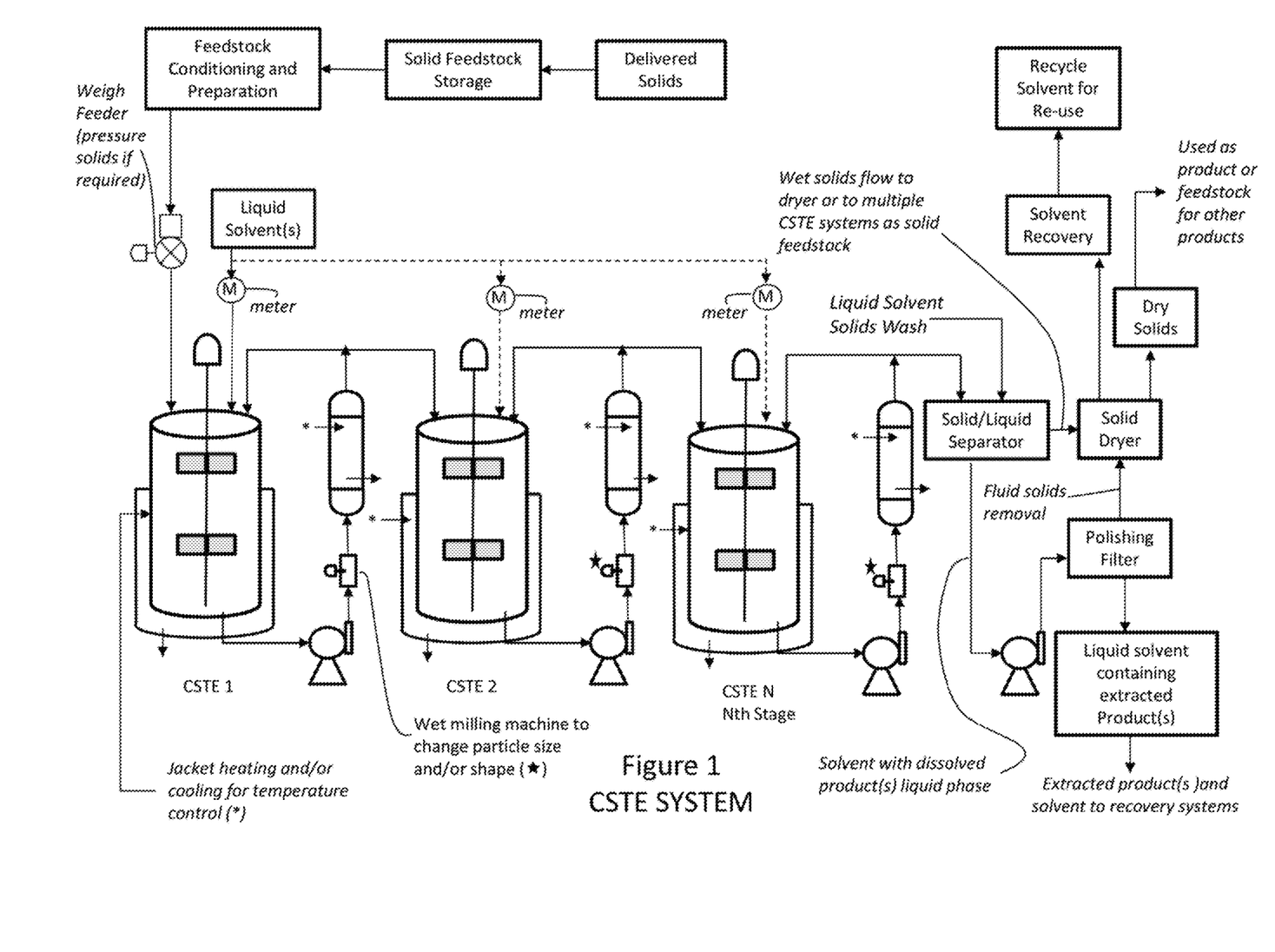
FIG. 1 is a schematic diagram of an exemplary CSTE system with 1 to N stages, a solid liquid separator, a wet solids dryer, product containing liquid and solvent for recovery, and product depleted solid for use as a saleable product or as feedstock for other products.
Figure 2:
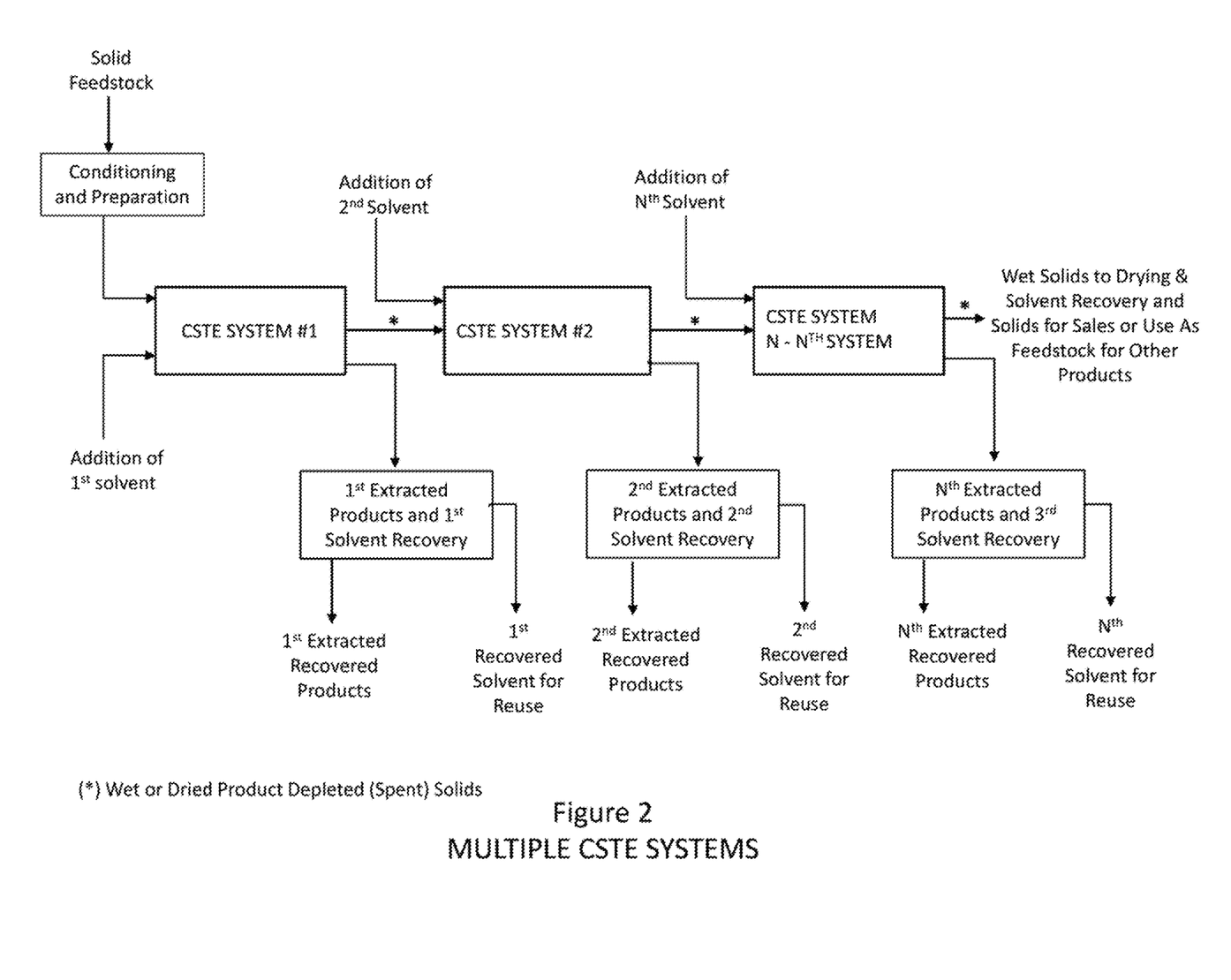
FIG. 2 is an exemplary process flow diagram for the Multiple CSTE Systems of FIG. 1.

FIG. 1 shows a schematic diagram of an exemplary CSTE system and FIG. 2 shows an exemplary process flow using multiple CSTE systems of FIG. 1. The CSTE system comprising one or more stages. Each stage may comprise a recirculation loop. The recirculation loop may comprise a particle size reducing and/or shape altering machine and/or a heat exchanger. Each of the stages is connected in series with the effluent of one stage flowing to the next stage in series. Effluent from the last stage flows to a solid-liquid separator. The CSTE system may further include equipment for separating the solids from the liquids, washing the solids for yield improvement, drying the solids, reclaiming solvent from wet solids, and collecting and/or transferring the product-containing liquid and product depleted solid to the next CSTE system or processing for final product recovery and storage and packaging, as applicable.

In one example of processing to illustrate the principles of operation of the system of FIGS. 1 and 2, biomass feedstock is used. The biomass feedstock may be received and stored. A storage area at the facility may be configured for storage of the biomass feedstock in a manner to maximize product yield and/or other the processing variables. The biomass feedstock may be in an as harvested condition, and/or in a partially or completely dried form. In certain embodiments, drying can be carried out at a temperature between about 60.degree. C. to about 105.degree. C. until the moisture level is reduced to less than 10% by weight. In certain embodiments the dried biomass can be stored in low-humidity chambers at ambient temperatures.

Thereafter, the biomass feedstock may be conditioned and prepared for introduction into the first stage of the CSTE system. The biomass may be washed, and chopped and separated (for instance, to remove undesirable portions from the useable portions (e.g., leaves and soft stems from roots and crowns, hull or husks from food grains, etc.). In addition to or in the alternative, the useable portion of the biomass feedstock may be further conditioned and prepared for processing. The solids may be chopped, shredded, milled, crushed, and pulverized to maximize particle surface area, size, and shape for maximizing the mass transfer of the liquid solvent to dissolve and solubilize the targeted product(s). Additional conditioning may include soaking or softening, and/or drying. Then, the conditioned and prepared biomass feedstock is controllably fed to the first stage through an automatic conveying means, i.e, conveyor, weigh feeder, rotary feeder, and/or gas transport. The adequately prepared, measured, and conditioned feedstock is then directly charged at a controlled mass flow rate into the first stage.

The first stage may operate at atmospheric pressure to allow the prepared and conditioned feedstock to be more easily introduced to the stage. In the first stage CSTE, the biomass solid may be further reduced in size and/or altered in shape. The first stage (and subsequent stages) may comprise agitator mixing and chopping blades. The particle size reduction and/or altering of the shape may be accomplished in one or more stages through the aggressive action of the mixing and chopping with the blades or through recirculation of the feedstock through an inline particle reduction and/or shape altering machine, i.e., the wet mill. Flow rate to the next stage in series may also be controlled by controlling the flow in the recirculation loop. In certain embodiments, at least one or more of the stirring blades in the stage may also be adapted for chopping or shearing biomass introduced into the stage. The stage can comprise a mixing blade adapted for mixing, a shearing blade adapted for cutting or shearing, or any combination of such blades. Further reduction in particle size and shape may be accomplished in subsequent stages, or subsequent CSTE systems, in the course of the processes provided herein (e.g., simultaneously with any of the extraction steps). Without seeking to be limited by theory, reducing the size and/or altering the shape of the biomass feedstock provides for high efficiency extraction of desired target product(s). Such reductions in size and changes in shape can be effected by chopping, shearing, macerating, grinding, milling, flaking, or any combination of such techniques. In certain embodiments, and not in any limiting way, the biomass feedstock may be reduced to a mean particle size of about 1-5 millimeters. In certain embodiments, the biomass feedstock is reduced to a mean particle size of about 2 millimeters or less.

A liquid solvent is introduced in the first stage to begin the extraction process. The amount of liquid solvent may be measured and controlled in accordance with the mass and volume of biomass feedstock introduced into the first stage. The liquid solvent may be introduced at atmospheric pressure or below or above atmospheric pressure in accordance with the type of solvent, the nature of the biomass, and the target product(s) for extraction from the biomass. The solvents may be aqueous phase liquids or any multitude of organic solvents. The biomass may be any renewable natural or agriculturally cultivated and grown plant material that can be harvested and transported to the manufacturing facility. The extraction processes provided in the stage can be effected by any method or combination of methods that exposes the solid-phase to the liquid phase such that the desired component or target product(s) of the solid phase are transferred to the liquid phase. This forms a product-containing liquid and product-depleted solid. The liquid solvent can be added to any additional stages of the CSTE system to provide additional flexibility to optimize the method and process.

In certain embodiments, for instance, the later in series stages, the stages can be further adapted to provide for heating and/or pressurization of the liquid or solid/liquid mixture. In certain embodiments, the pressure of the stage can be increased above atmospheric pressure to allow for extraction of the solid with liquid at a temperature that is above the boiling point of the liquid at atmospheric pressure. The overall residence time and incubation time for this continuous liquid phase extraction is a function of the volume of each tank in the CSTE system, the number of stages in the CSTE system, the rate of introduction of the solids (e.g., biomass feedstock, depleted or spent biomass from a prior CSTE system) and liquid solvents (e.g., aqueous phase liquids, polar organic solvents, non-polar organic solvents) into a stage, and the flow rate through any recirculation loops associated with a stage. Any selectable parameters may be adjusted as necessary to allow for the commercial scale economic extraction of the target product(s).

In one example, a first stage may be configured for high shear and agitation. A slurry pump for the stage may be arranged in a recirculation loop with a wet mill that further reduces the particle size and/or alters the shape of the biomass feedstock. Adequately prepared and conditioned biomass feedstock may be directly charged at a controlled rate into the first stage. Water may be introduced into the first stage as an initial solvent to extract the water soluble sugars or other target product(s) from the biomass slurry. The water may be at a temperature of about 50 degrees C. to 100 degrees C. Without being limited to any theory, it is believed that it may be beneficial to remove carbohydrates from the biomass feedstock to produce carbohydrate-depleted biomass, which has been found to provide efficient solvent extraction for the downstream processing of the biomass to produce natural rubber and other organic byproducts. Also, the removal of water soluble organic and inorganic materials may improve the purity of the recovered solvent extracted organic compounds and other target product(s) in the downstream processes. Additives to control pH and other processing conditions, such as foaming and wetting of the biomass, may be added as needed. The overall residence time and incubation time for the initial continuous extraction can be controlled by the flow rate of the biomass feedstock and the liquid solvent.

Exiting slurry from the last extraction stage may be continuously transferred with a slurry pump to a continuously operated solid-liquid separator. The last in series stage may be operated at a reduced temperature and pressure, and/or an added heat exchanger, so as to cool the slurry biomass prior to separation in the solid-liquid separator. The decanted wet solids can be washed with fresh solvent for product yield improvement. The liquids may be transferred to a solution storage tank for concentration and purification. The solvent wet biomass solids may be transferred to the next CSTE system for additional solvent extraction using a different solvent and recovering additional products. The solids-liquid separator is preferably a continuous belt press where the solids are hydraulically pressed to remove the maximum amount of liquid. Continuous centrifuges of many types and configurations, as well as other conventional filtration, settling, and flotation processes can be used in any configuration or combination as equipment to complete this process.

Figure 3:
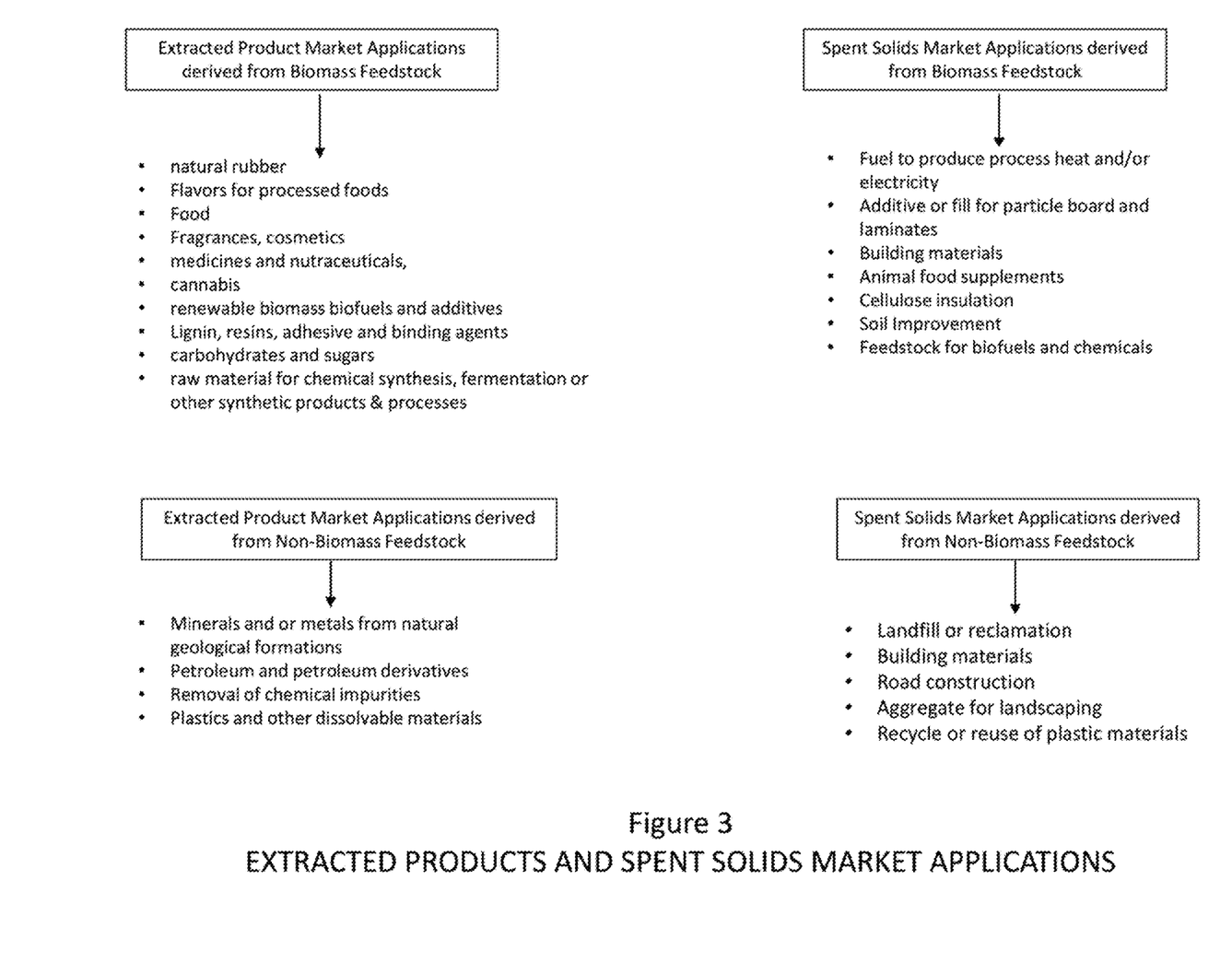
FIG. 3 is a schematic diagram showing uses and market applications of extractable products and depleted solids after processing in the CSTE system(s) of FIG. 1 or 2.

As depicted in FIG. 2, the process may be repeated as necessary depending upon the biomass, solvent, target product(s), and CSTE system efficiency. The solvent wet solids may be transferred for spent biomass processing. The solids free liquids with the target dissolved product(s) may be transferred for purification and final product(s) recovery. The finished or target product(s) may be packaged and inventoried or shipped in bulk for sale. The target product depleted biomass may be further processed for re-use. Solvents used during the extraction process may be recovered, purified, and recycled for re-use. The wet spent target depleted solids may be dried with collection equipment and recycled or reused, as described above as shown in FIGS. 1 and 2. The uses and market applications of extractable products and depleted solids after processing in the CSTE system(s) is shown in FIG. 3.

As various modifications could be made in the constructions and methods herein described and illustrated without departing from the scope of the invention, it is intended that all matter contained in the foregoing description are shown in the accompanying drawings shall be interpreted as illustrative and not as limiting. The breadth and scope of the present invention should not be limited by any of the above-described exemplary embodiments.

What is claimed:

1. A feedstock processing system for extracting a product from a solid, the system comprising:
    a continuous stirred tank extraction (CSTE) system comprising a plurality of continuous stirred tank extraction stages arranged in fluid communication with each other in series such that effluent from one continuous stirred tank extraction stage flows to a next continuous stirred tank extraction stage in the series of the plurality of continuous stirred tank extraction stages, each of the continuous stirred tank extraction stages having a tank, each tank having an agitator therein, at least one of the continuous stirred tank extraction stages having an inlet in fluid communication with the tank of the at least one continuous stirred tank extraction stage, the inlet adapted and configured to allow a measured amount of liquid solvent and the solid to be introduced to the at least one continuous stirred tank extraction stage, the agitator of the at least one continuous stirred tank extraction stage being adapted and configured to mix the solid with the introduced solvent to form a homogeneous slurry to enable the product associated with the solid to be extracted with the solvent; and
    a solid-liquid separator arranged in fluid communication with the last in series continuous stirred tank extraction stage, the solid-liquid separator being adapted and configured to receive an effluent from the last in series continuous stirred tank extraction stage and separate the liquid solvent containing the product from the solid to form a product-containing liquid and a product-depleted solid; and
    further comprising a recirculation loop associated with the at least one continuous stirred tank extraction stage; and
    wherein the recirculation loop includes a device adapted and configured to at least one of reduce a particle size and alter a shape of the solid in the effluent of the recirculation loop.

2. The system of claim 1 wherein the recirculation loop includes a heat exchanger configured and adapted to change the temperature of the effluent in the recirculation loop.

3. The system of claim 1 wherein the device in the recirculation loop for at least one of reducing the particle size and altering the shape of the solid in the effluent of the recirculation loop comprises a wet mill.

4. The system of claim 1 further comprising a second CSTE system comprising a second plurality of continuous stirred tank extraction stages arranged in fluid communication with each other in series such that effluent from one continuous stirred tank extraction stage flows to a next continuous stirred extraction stage in the series of the second plurality of continuous stirred tank extraction stages, the second plurality of continuous stirred tank extraction stages being in fluid communication with the solid-liquid separator in a manner to receive the product depleted solid from the solid-liquid separator, at least one of the continuous stirred tank extraction stage of the second plurality of continuous stirred tank extraction stages having an inlet adapted and configured to allow a second measured amount of solvent and the product depleted solid to be introduced to the at least one continuous stirred tank extraction stage of the second plurality, the at least one continuous stirred tank extraction stage being adapted and configured to mix the product depleted solid with the introduced second solvent to enable a second product associated with the product depleted solid to be extracted by the second solvent.

5. The system of claim 1 wherein the solid is a biomass feedstock.

6. A feedstock processing system for extracting a product from a solid, the system comprising:
    a continuous stirred tank extraction (CSTE) system comprising a plurality of continuous stirred tank extraction stages arranged in fluid communication with each other in series such that effluent from one continuous stirred tank extraction stage flows to a next continuous stirred tank extraction stage in the series of the plurality of continuous stirred tank extraction stages, each of the continuous stirred tank extraction stages having a tank, each tank having an agitator therein, at least one of the continuous stirred tank extraction stages having an inlet in fluid communication with the tank of the at least one continuous stirred tank extraction stage, the inlet adapted and configured to allow a measured amount of liquid solvent and the solid to be introduced to the at least one continuous stirred tank extraction stage, the agitator of the at least one continuous stirred tank extraction stage being adapted and configured to mix the solid with the introduced solvent to form a homogeneous slurry to enable the product associated with the solid to be extracted with the solvent; and
    a solid-liquid separator arranged in fluid communication with the last in series continuous stirred tank extraction stage, the solid-liquid separator being adapted and configured to receive an effluent from the last in series continuous stirred tank extraction stage and separate the liquid solvent containing the product from the solid to form a product-containing liquid and a product-depleted solid;
    wherein the agitator of the at least one continuous stirred tank extraction stage has shear blades adapted and configured to increase to at least one of reduce the particle size and alter the shape of the solid in the continuous stirred tank extraction stage.

7. The system of claim 6 further comprising a recirculation loop associated with the at least one continuous stirred tank extraction stage.

8. The system of claim 7 wherein the recirculation loop includes a heat exchanger configured and adapted to change the temperature of the effluent in the recirculation loop.

9. The system of claim 7 wherein the recirculation loop includes a device adapted and configured to at least one of reduce a particle size and alter a shape of the solid in the effluent of the recirculation loop.

10. The system of claim 9 wherein the device in the recirculation loop for at least one of reducing the particle size and altering the shape of the solid in the effluent of recirculation loop comprises a wet mill.

11. The system of claim 6 further comprising a second CSTE system comprising a second plurality of continuous stirred tank extraction stages arranged in fluid communication with each other in series such that effluent from one continuous stirred tank extraction stage flows to a next continuous stirred extraction stage in the series of the second plurality of continuous stirred tank extraction stages, the second plurality of continuous stirred tank extraction stages being in fluid communication with the solid-liquid separator in a manner to receive the product depleted solid from the solid-liquid separator, at least one of the continuous stirred tank extraction stage of the second plurality of continuous stirred tank extraction stages having an inlet adapted and configured to allow a second measured amount of solvent and the product depleted solid to be introduced to the at least one continuous stirred tank extraction stage of the second plurality, the at least one continuous stirred tank extraction stage being adapted and configured to mix the product depleted solid with the introduced second solvent to enable a second product associated with the product depleted solid to be extracted by the second solvent.

12. The system of claim 6 wherein the solid is a biomass feedstock.

13. A method for extracting product(s) from a solid, the method comprising:
    introducing the solid into a continuous stirred tank extraction (CSTE) system wherein the CSTE system comprises a plurality of continuous stirred tank extraction stages arranged in fluid communication with each other in series such that effluent from one continuous stirred tank extraction stage flows to a next continuous stirred extraction stage in the series of the plurality of continuous stirred tank extraction stages, each of the continuous stirred tank extraction stages having a tank, each tank having an agitator therein, at least one of the continuous stirred tank extraction stages having an inlet;
    introducing, via the inlet of the at least one continuous stirred tank extraction stage, measured amounts of the first and second solvents into the CSTE system;
    mixing, via the agitator of the at least one continuous stirred tank extraction stage, the first and second solvents with the solid in the at least one continuous stirred tank extraction stage in a manner to enable a first product associated with the solid to be extracted in the first solvent, and a second product associated with the solid to be extracted in the second solvent;
    introducing an effluent from the at least one continuous stirred tank extraction stage into a solid-liquid separator and forming a first product-containing liquid, a second-product containing liquid, and a first and second product-depleted wet solid; and
    at least one of reducing a particle size and/or altering the shape of the solid in the at least one continuous stirred tank extraction stage with a shear blade associated with the agitator.

14. The method of claim 13 wherein the first and second solvents are miscible.

15. The method of claim 13 wherein the first and second solvents are immiscible.

16. The method of claim 13 further comprising: (i) recirculating effluent associated with the at least one continuous stirred tank extraction stage, and (ii) altering at least one of the pressure and temperature of the effluent to increase a solubility of the product in the solvents.

17. A method for extracting product(s) from a solid, the method comprising:
    introducing the solid into a continuous stirred tank extraction (CSTE) system wherein the CSTE system comprises a plurality of continuous stirred tank extraction stages arranged in fluid communication with each other in series such that effluent from one continuous stirred tank extraction stage flows to a next continuous stirred extraction stage in the series of the plurality of continuous stirred tank extraction stages, each of the continuous stirred tank extraction stages having a tank, each tank having an agitator therein, at least one of the continuous stirred tank extraction stages having an inlet;
    introducing, via the inlet of the at least one continuous stirred tank extraction stage, measured amounts of the first and second solvents into the CSTE system;
    mixing, via the agitator of the at least one continuous stirred tank extraction stage, the first and second solvents with the solid in the at least one continuous stirred tank extraction stage in a manner to enable a first product associated with the solid to be extracted in the first solvent, and a second product associated with the solid to be extracted in the second solvent;
    introducing an effluent from the at least one continuous stirred tank extraction stage into a solid-liquid separator and forming a first product-containing liquid, a second-product containing liquid, and a first and second product-depleted wet solid; and
    (i) recirculating effluent associated with the at least one continuous stirred tank extraction stage, and (ii) at least one of reducing a particle size and altering the shape of the solid in the effluent during recirculating of the effluent.

18. The method of claim 17 wherein the first and second solvents are immiscible.

19. The method of claim 17 wherein the first and second solvents are miscible.

20. The method of claim 17 further comprising: (i) recirculating effluent associated with the at least one continuous stirred tank extraction stage, and (ii) altering at least one of the pressure and temperature of the effluent to increase a solubility of the product in the solvents.

* * * * *